United States Patent [19]

Daimaru et al.

[11] Patent Number: 5,378,218
[45] Date of Patent: Jan. 3, 1995

[54] NC-MACHINING CONTROLLER

[75] Inventors: Koji Daimaru; Koichi Takata; Kenichi Yoshizawa; Masahiro Shoji, all of Ishikawa, Japan

[73] Assignee: Kabushiki Kaisha Komatsu Seisakusho, Tokyo, Japan

[21] Appl. No.: 966,039

[22] PCT Filed: Jul. 3, 1991

[86] PCT No.: PCT/JP91/00896
§ 371 Date: Dec. 30, 1992
§ 102(e) Date: Dec. 30, 1992

[87] PCT Pub. No.: WO92/00830
PCT Pub. Date: Jan. 23, 1992

[30] Foreign Application Priority Data

Jul. 3, 1990 [JP] Japan ................................. 2-175600

[51] Int. Cl.6 .......................................... B23Q 3/157
[52] U.S. Cl. ................................. 483/9; 364/474.21; 483/8
[58] Field of Search ..................... 483/1, 4, 5, 7, 8, 9, 483/11; 364/474.21

[56] References Cited

U.S. PATENT DOCUMENTS 4,118,844 10/1978 Matsuzake et al. .................. 29/27 C
5,205,805 4/1993 Otani et al. ............................ 483/9

FOREIGN PATENT DOCUMENTS

| | | |
|---|---|---|
| 63466 | 10/1982 | European Pat. Off. . |
| 2598108 | 11/1987 | France . |
| 3521844 | 1/1987 | Germany . |
| 44-1112 | 1/1969 | Japan . |
| 53-28872 | 3/1978 | Japan . |
| 56-76354 | 6/1981 | Japan . |
| 127644 | 8/1982 | Japan ................................. 483/8 |
| 37028 | 2/1984 | Japan ................................. 483/8 |
| 34743 | 2/1987 | Japan ................................. 483/8 |
| 2088139 | 9/1988 | Japan . |
| 222809 | 9/1989 | Japan . |
| 2-71952 | 3/1990 | Japan . |
| 237730 | 9/1990 | Japan ................................. 483/8 |

OTHER PUBLICATIONS

International Search Report dated Oct. 7, 1991 of PCT/JP91/00896.
International Preliminary Examination Report dated Jul. 27, 1992.
European Search report dated May 17, 1993.
VDI—Zeitschrift 131 (1989) Sep., No. 9, Dusseldorf, DE w/translation.
Robotics and Computer—Integrated Manufacturing 7 (1960) No. 1/2, Elmfsfor, N.Y., US.

*Primary Examiner*—William Briggs
*Attorney, Agent, or Firm*—Diller, Ramik & Wight

[57] ABSTRACT

According to this invention, common tool codes for specifying tools are used in a whole system, a T code command including tool codes, tool shape information and tool machining ability information are inputted into each NC machine, and this information is converted into local information of individual NC machines to perform machining. The tool codes and the tool information can be subjected to centralized control as a whole in the system.

7 Claims, 9 Drawing Sheets

NC-MACHINING CONTROLLER

TECHNICAL FIELD

The present invention relates to an NC-machining system comprising a plurality of NC-machine tools each having a tool changer and, more particularly, to an improvement in a T code command part of an NC-machining program.

BACKGROUND ART

A tool changer provided in an NC machining tool has a plurality of magazine pots in which various sorts of tools are loaded, and is arranged so that desired one of the tools is taken out from the associated magazine pot under control of an instruction and then mounted to the NC machine tool for machining.

The following is an example of a conventional NC machining program for the selection of tools.

* T01
* G43H01
* S543M03
* F100

T01: Specify the magazine address of each machine, in this example, to "1".

G43: Correct tool length

H01: Select a correction number H01.

S543: Set main shaft rotational speed to 543 rpm

M03: Forward rotation command

F100: Set feed command value to 100 mm/min.

In the conventional NC machining program, the T code command is to specify a magazine address, not to select a tool directly. Command parts corresponding to correction commands and machining condition commands such as G43H01, S543M03, F100, etc. vary depending on a tool to be used, ability of each machine tool and a material of work to be machined. These command parts are set by an operator at appropriate values for each operation, taking a tool to be used into consideration.

A large number of NC machine tools are generally installed in a factory, each NC machine tool being provided with a tool changer. However, the correspondence between a tool and its magazine address is determined arbitrary at each tool changer and thus there has been no standard for the correspondence between the tool and magazine address. For example, there occurs such a situation that the magazine address 1 of one tool changer corresponds to an end mill tool having a diameter of 25 mm while the magazine address 1 of another tool changer corresponds to a milling cutter tool having a diameter of 100 mm. For this reason, in the conventional NC machining program in which the selection of tools is preformed by specifying a magazine address in a T code command, it is necessary to modify the T code command part for each NC machine tool.

The program modification requires not only change in the T code command part but also change in such command parts as G43H01, S543M03, F100, etc., which results in that each time a tool is changed, it is necessary to modify the machining program to a large extent.

As the number of types of machining works has been increased recently, there has been a tendency that the number of tools exceeds the tool accommodation capacity of the magazines.

There has bee a swing head device for a composite machine tool capable of preforming various types of machining including boring, turning and milling. The swing head device comprises a turntable on which a work to be machined is mounted and a swing head positioned above the turntable on which a tool is mounted. The turntable is movable horizontally in X-axis and Y-axis directions and the swing head is movable vertically in an Z-axis direction and rotatable around a pivot axis in a Y-Z plane.

FIG. 13 illustrates an example of a conventional swinging mechanism for turning the swing head. In the illustrated swinging mechanism, a rack d vertically moved by a swing cylinder c is meshed with a pinion b provided to a pivotable swing head a so that the swing cylinder c rotates the swing head a through the rack d and the pinion b. A curving coupling e is provided between the swing head a and a main shaft head (not shown) so that the curving coupling e fixes the swing head a at a desired indexing position.

In the conventional swing head device, a proximity switch or a limit switch or a lead switch is provided in the vicinity of the swing cylinder to detect that the swing head is located at an indexing position. When the number of indexing positions is increased, the number of the switches correspondingly increased. Therefore, the conventional swing head device is disadvantageous in that the size of the device becomes large, its arrangement become complicated and the cost becomes high.

In view of such circumstances, it is an object of the present invention to provide an NC-machining controller which can perform centralized control on the tool information, can use a common machining program to different machine tools, and can improve working efficiencies of the respective machine tools.

Another object of the present invention is to provide a swing head device of a composite machine tool which can accurately detect indexing positions of the swing head with a simple and inexpensive arrangement.

DISCLOSURE OF INVENTION

In accordance with an aspect of the present invention, there is provided an NC machining controller for an NC machining system including a plurality of NC machining apparatuses each having a tool changer for allowing automatic selection of a desired tool from a plurality of magazine pots, the NC machining controller comprising a first computer for performing general control over the plurality of NC machining apparatuses, the first computer having a tool code memory for storing data on correspondence between tools and tool codes; and means for generating an NC machining program including a T code command to which a specified tool code is added and for outputting the NC machining program to the NC machining apparatuses, and a plurality of second computers connected to the first computer and provided in each of the NC machining apparatuses, the second computers each having a magazine address memory for storing data on correspondence between a tool code and a magazine address of a the associated tool changer; and means for converting a tool code added to the T code command in the NC machining program into a magazine address of the tool changer corresponding to the tool code on the basis of contents stored in the magazine address memory and for generating a T code command for specifying the converted magazine address, wherein each of the NC machining apparatuses and associated one of the tool changers are driven according to the NC machining program including the generated T code command.

In accordance with another aspect of the present invention, there is provided an NC machining controller for an NC machining system including a plurality of NC machining apparatuses each having a tool changer for allowing automatic selection of a desired tool from a plurality of magazine pots, the NC machining controller comprising a first computer for performing general control over the plurality of NC machining apparatuses, the first computer having a tool code memory for storing data on correspondence between tools and tool codes a memory for storing tool shape information and machining ability information for each of the tool codes; and means for generating an NC machining program including a T code command to which a specified tool code is added and for outputting the NC machining program to the NC machining apparatuses together with the tool shape information and machining ability information corresponding to the specified tool, and a second computer connected to the first computer and provided in each of the NC machining apparatuses, the second computer having a magazine address memory for storing data on correspondence between the tool code and a magazine address of the associated tool changer; means for converting the tool code added to the T code command in the NC machining program into a magazine address of the tool changer corresponding to the tool code on the basis of contents stored in the magazine address memory and for generating a T code command for specifying the converted magazine address; means for generating a tool correction command on the basis of the tool shape information received from the computer; and means for generating a machining condition command on the basis of the machining ability information received from the computer, wherein each of the NC machining apparatuses and associated one of the tool changers are driven according to the NC machining program including the generated T code command, tool correction command and machining condition command.

With the arrangement of the present invention, code information common to the plurality of NC machining apparatus is uses as a tool code. The superordinate first computer adds a tool code corresponding to a specified tool to the T code, generates a machining program including the T code command, and sends the machining program to a desired NC machining apparatus. The second computer is provided in the side of the NC machining apparatuses. It sets the correspondence between tool codes and magazine addresses, converts the tool code in a received T code command part into a magazine address corresponding to the tool code, and adds the converted magazine address to the T code, thereby to generate a T code command.

The first computer also adds the tool shape information and machining ability information corresponding to a selected tool code to the machining program, and sends it to the associated NC machining apparatus. The NC machining apparatus side generates the tool correction command and machining condition command on the basis of the received tool shape information and machining ability information, and drives the NC machining apparatus and the tool changer according to the machining program including the generated T code command, tool correction command and machining condition command.

With the above construction of the present invention, the tool code for specifying the tool is in common to the whole system, the T code command to which the tool code is added is input to the respective NC machining apparatuses together with the tool shape information and tool machining ability information. Each NC machining apparatus converts the received information into local information suitable for the NC machining apparatus. Thus, the tool code and tool information can be central-controlled in the whole system. The present invention exhibits the following effects.

* The superordinate system control only the common items to be managed in the whole system.
* Technology associated with local NC machining apparatuses can be modified at their associated sections in charge without modifying the superordinate system. Therefore, changes of arrangements can be easily made at a lower cost.
* Tools can be purchased according to the plan and idea of the whole system without considering each NC machining apparatus. Therefore, the tool purchase cost can be reduced.
* Since the tool information is controlled as a whole, machining can be carried out under appropriate conditions by comparing machining conditions of each NC machining apparatus.
* When the number of necessary tools exceeds the magazine capacity, machining operation can be performed by changing tools in the magazine and by using the changed tools without modifying the machining program. Therefore, the magazine capacity can be doubled and thus the working efficiency of each NC machining apparatus can be increased.

In accordance with a further aspect of the present invention, there is provided a swing head device for a composite machine tool comprising a turntable for mounting a workpiece to be machined, the turntable being movable in a horizontal direction; a main shaft head movable in a vertical direction; a swing cylinder provided within the main shaft head and having a piston rod to which a rack is connected; a pinion meshed with the rack; a swing head connected to the pinion and capable of vertically swing by the movement of the piston rod of the swing cylinder through the rack and pinion, for mounting a tool for machining the workpiece; and curving coupling for clamping and unclamping the swing head to the main shaft head, wherein driving of the swing cylinder causes the swing head to be positioned at a predetermined index position, the swinging head further comprising detection means such as a linear encoder for detecting a stroke of the swing cylinder. The swing head device may further comprise control means for quickly swinging the swing head until the detection means detects the index position, and then for swinging the swing head in the reverse direction thereto at a very slow speed until the detection means again detects the index position for positioning control.

With the above construction of the present invention, since the index positions of the swing head are measured by a detector such as a linear encoder which detects the stroke of the swing cylinder, even when the number of index positions is increased, the index positions can be detected by a single detector. Accordingly, the apparatus can be made small in size, simplified in construction and inexpensive compared to the conventional apparatus where a proximity switch is provided for each index position. Further, since the positioning is carried out by moving the swing head at a high speed to reach near to the index position and thereafter at a slow speed in the reverse rotation, accurate positioning can be achieved with a simple arrangement while avoiding the influence of backlash of the rack and pinion which drive the swing head.

BEST MODE FOR CARRYING OUT THE INVENTION

The invention will be detailed in connection with embodiments shown in the attached drawings.

Figure 1:
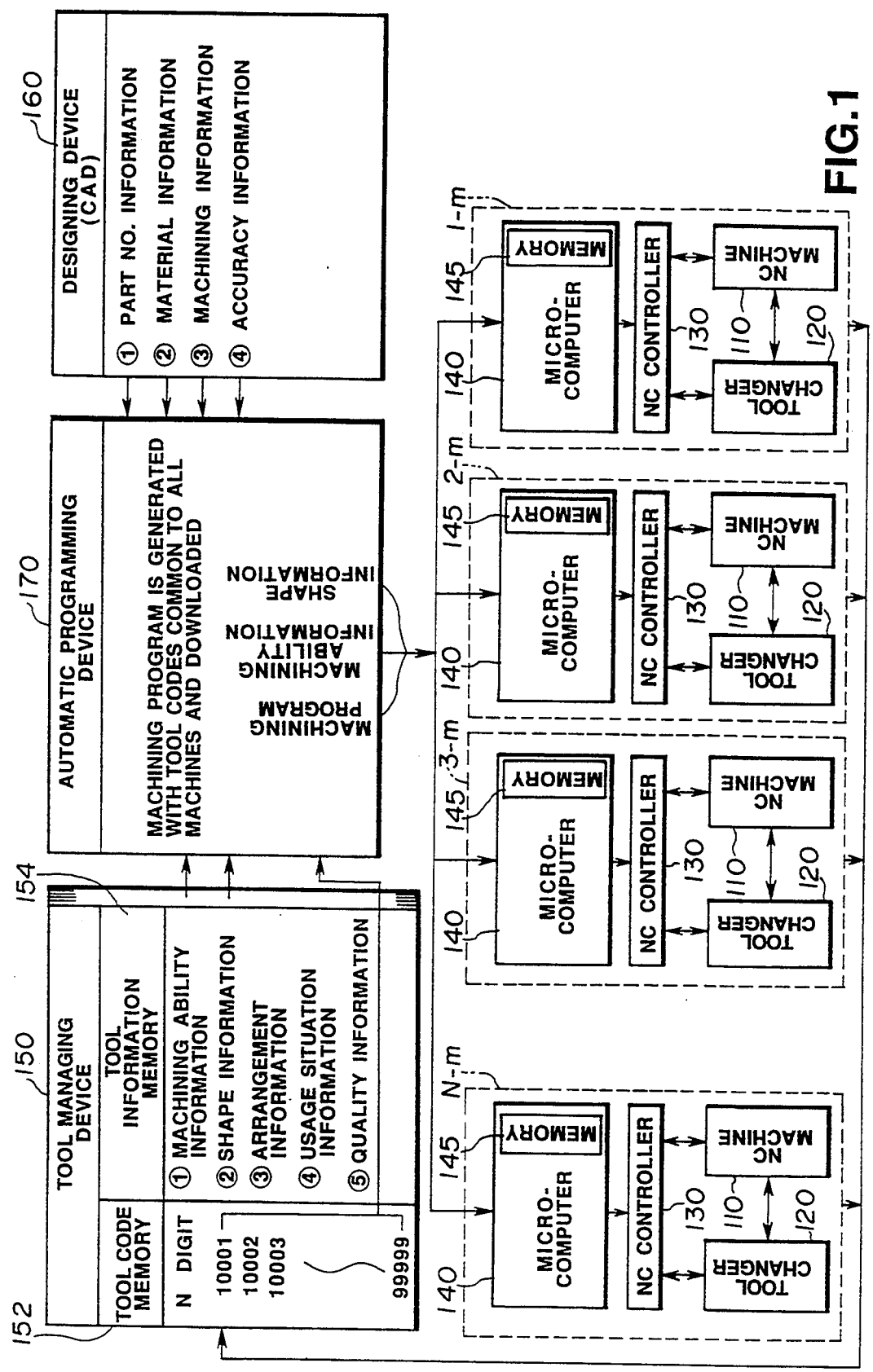
FIG. 1 is a block diagram of a first embodiment of the present invention.

FIG. 1 shows a system in accordance with an embodiment of the present invention. The illustrated system includes a plurality of NC machine tools 1-m to N-m. Each of the NC machine tools 1-m to N-m comprises an NC machine tool 110, a tool changer 120, an NC controller 130 and a microcomputer 140. This system is intended for use in a factory.

Figure 2:
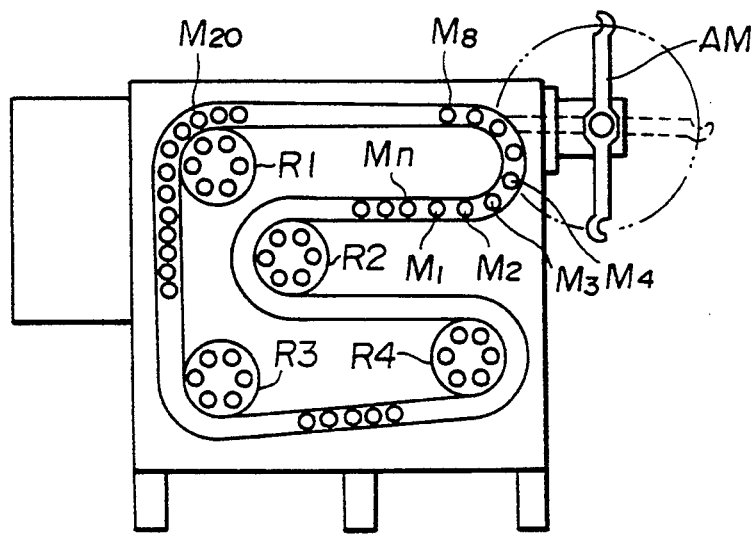
FIG. 2 illustrates an example of a tool changer.

The tool changer 120, as shown in FIG. 2, has a plurality of magazine pots M1 to Mn in which various tools are loaded. These magazine pots M1 to Mn are freely moved through the rotation of rollers R1 to R4 so that a desired tool is selected by grasping a tool loaded in a magazine pot at a predetermined position by an arm AM. The selected tool is automatically mounted to the NC machine tool 110 by a mechanism (not shown). Through an operation reverse to the above operation, the tool mounted to the NC machine tool 110 is returned to be accommodated into a predetermined magazine pot. In this manner, any tool can be automatically changed.

The microcomputer 140 incorporates a conversion program (to be described later) which converts a machining program received from an automatic programming device 170 into a local program usable in the associated NC machine tool, and then sends the local program to the NC controller 130. A recently-manufactured NC controller may be provided with the microcomputer 140, in which case it is unnecessary to provide a new microcomputer.

A designing device (CAD system) 160 generates part number information, material quality information, machining information and accuracy information necessary for product machining according to operator's designation, and then inputs these information to an automatic programming device 170. Of these information, the part number information is used to specify a machining program number and the material quality information, machining information and accuracy information are used to create a machining program.

A tool managing device 150 has a tool code memory 152 in which a table showing a correspondence between a multiplicity of tools and codes thereof are previously stored. In the illustrated example, each tool code comprises a binary code of predetermined bits indicative of a 5 digit decimal number. In this case, these tool codes are commonly used to all the NC machine tools 1-m to N-m within the system. In other words, a tool code corresponding to a tool is identical with all the NC machine tools 1-m to N-m.

The tool managing device 150 also has a tool information memory 154 in which tool information are previously stored in association with the respective tools (tool codes). The tool information includes (1) machining ability information, (2) shape information, (3) arrangement information, (4) usage situation information, and (5) quality information, which are all rearranged according to the different tool codes. Of these 5 information, (3) arrangement information, (4) usage situation information and (5) quality information are used for tool management; while the remaining (1) machining ability information and (2) shape information are used as information to be sent to the NC machine tools 1-m to N-m.

(1) machining ability information includes main shaft rotational speed and feed speed, whereas (2) shape information includes tool shape and various dimensions.

The automatic programming device 170 selects a desired tool according to the quality information, machining information and accuracy information received from the designing device 160, reads out a tool code corresponding to the selected tool from the tool managing device 150, and automatically generates a machining program on the basis of these quality information, machining information and accuracy information. The machining program generated by the automatic programming device 170 is partly exemplified below.

T12345
G43H**
S***M03
F*** where

T12345: Specify a tool code In this case, tool code is 12345.

G43: Correct tool length

H: Select correction number H

S*: Set main shaft rotational speed to *rpm

M03: Forward rotation command

F*: Set feed command value to *mm/min

Portion shown by asterisks * in the above program are blank and will be entered through the processing of the microcomputer 140 of the respective NC machine tools.

Figure 3:
FIG. 3 illustrates a signal outputted from an automatic programming device.

The automatic programming device 170 generates the machining program, reads out from the tool managing device 150 (1) machining ability information and (2) shape information corresponding to the selected tool code, and outputs the machining program to desired NC machine tools while being added to the information as shown in FIG. 3.

Each microcomputer 140 of the NC machine tools 1-m to N-m has a conversion program which converts the machining program common to all the system received from the automatic programming device 170 into a local machining program which can be interpreted by associated one of the NC machine tools 1-m to N-m.

When a T code command in the machining program is issued not in the form of magazine address as in the conventional device but in the form of tool code for management of the entire factory, there occur the following problems in instruction parts such as correction command and machining condition command.

* A data (5-digit command) on a tool code cannot be accepted by the NC controller. Further, in the NC controller, the T code is defined as one for specifying a magazine address and the tool code does not coincide with the magazine address.

* With regard to the correction command part, since the correspondence between the correction number and correction content is set to vary from NC machine tool to NC machine tool, the automatic programming device cannot specify the correction number.

* Even with regard to such machining condition command part as a main shaft rotation command or feed/min command, the machine tools have different abilities and the automatic programming device cannot specify these commands.

To avoid these problems, the conversion program of the microcomputer 140 provided in each NC machine tool converts the machining program received from the superordinate computer into a program which can match the associated NC machine tool. Accordingly, the conversion programs of the NC machine tools 1-m to N-m have different contents. The conversion program is written in custom macro language which can establish an interface with the NC controller 130.

The conversion program is made up mainly of three sorts of software (1) to (3) which follow.

(1) A program for checking of the command value of T code.

(2) A program for conversion of the command value of T code.

This program converts a T code command value for specifying a tool received from the automatic programming device 170 into a T code command for specifying a magazine address of the associated NC machine tool. A correspondence table between tool codes and magazine addresses is previously set and stored in a memory 145 in the microcomputer 140.

(3) A program for determination of correction number, correction data and machining condition value.

This program generates a correction number and a correction data on the basis of the received tool shape information and also generates such machining condition commands as main shaft rotational speed and feed/-min. on the basis of the received tool machining ability information.

In the memory 145 of the microcomputer 140, a correspondence table between the tool shape information, correction number and correction data and a correspondence table between the machining ability information and machining condition command are previously stored.

Figure 4:
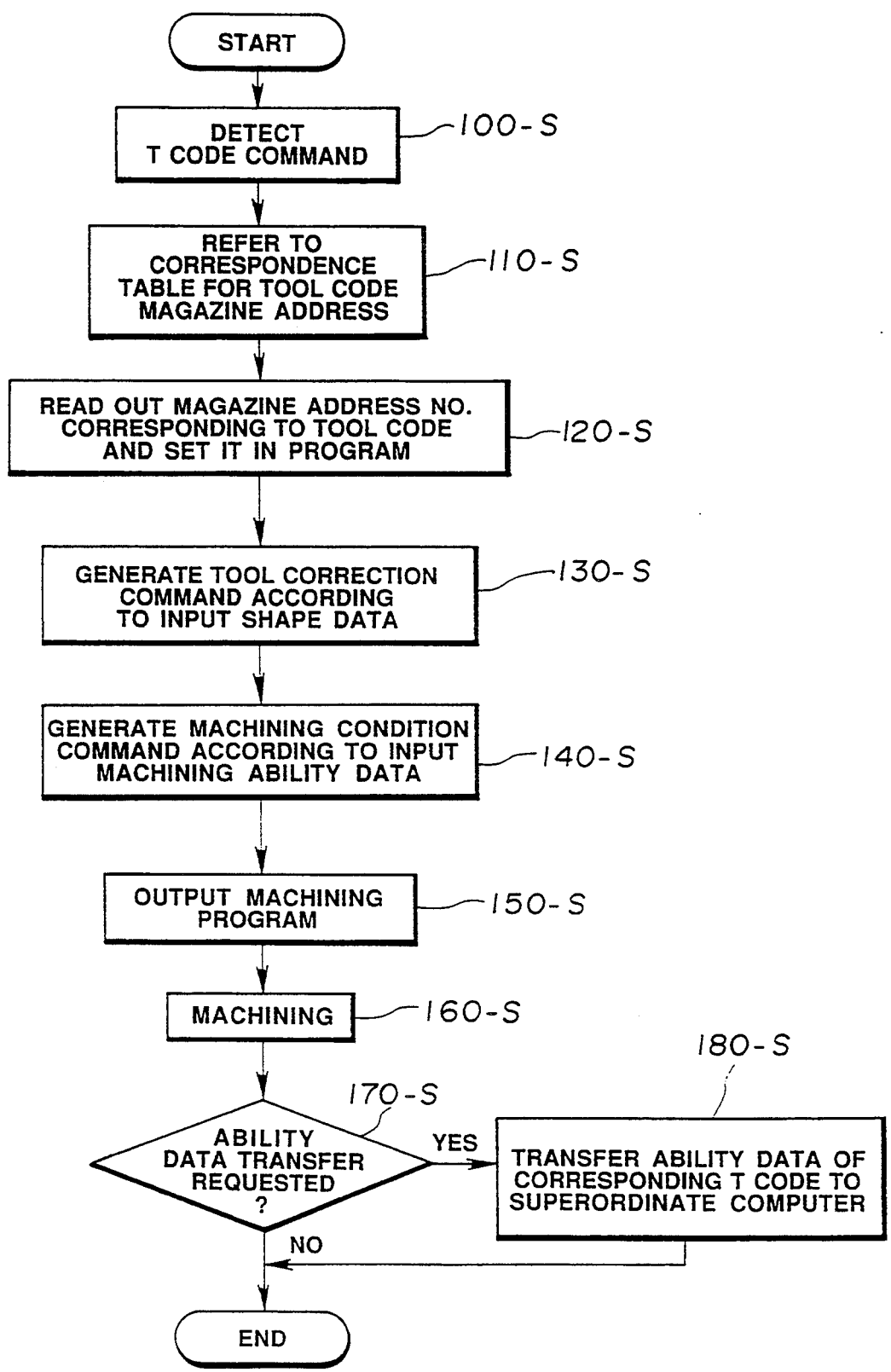
FIG. 4 is a flowchart illustrating the operation of the first embodiment.

The operation of each NC machine tool will be explained by referring to a flowchart of FIG. 4.

When one of the NC machine tools receives from the automatic programming device 170 a machining program to which the tool ability information and tool shape information is added as shown in FIG. 3, the microcomputer 140 of the NC machine tool extracts a T code command part from the received machining program (step 100-S) and detects a tool code in the T code command part. The microcomputer 140 reads out a magazine address corresponding to the detected tool code by referring to the correspondence table between the tool codes and magazine addresses (step 110-S) and sets the read-out magazine address in the T code part of the machining program (step 120-S).

Next, the microcomputer 140 generates a tool correction command with use of the tool shape information received from the automatic programming device 170 and a machining condition command indicative of main shaft rotational speed and feed command value with use of the received tool machining ability information (steps 130-S and 140-S). Then, the microcomputer 140 sets these generated tool correction and machining condition commands at necessary positions in the machining program to complete its own machining program.

An example of the machining program completed by the microcomputer 140 is shown below. In this program, unlike an output program of the automatic programming device 170 as given earlier, blank parts are filled.

T12
M16
G43H#102
G43H#103
G42D#104
S543M03
F#106
:
:
M16
M30 where

T12: Specify a magazine address. In this case, magazine address is 12.

M16: Tool change command

G43: Correct tool length

H#102: Select correction number D#104 (tool correction command)

G42: Correct tool diameter

D#104: Select correction number D#104 (tool correction command)

S543: Set main shaft rotational speed to 543 rpm (machining condition command)

M03: Forward rotation command

F#106: Set feed command value to 106 mm/min (machining condition command)

M30: End

The microcomputer 140 outputs the machining program thus generated to the NC controller 130 (step 150-S). The NC controller 130 controllably drives the tool changer 120 and the NC machine tool 110 according to the received machining program to thereby execute the necessary tool changing and NC machining operations (step 160-S).

When a transfer request of the tool machining ability information is issued from the tool changer 120, the machining ability information corresponding to the specified tool code is transferred to the tool changer 120 (steps 170-S and 180-S).

Although a plurality of NC machine tools are controlled for each factory in the foregoing embodiment, it may be so arranged that NC machine for the whole company or for a group are controlled.

Figure 5:
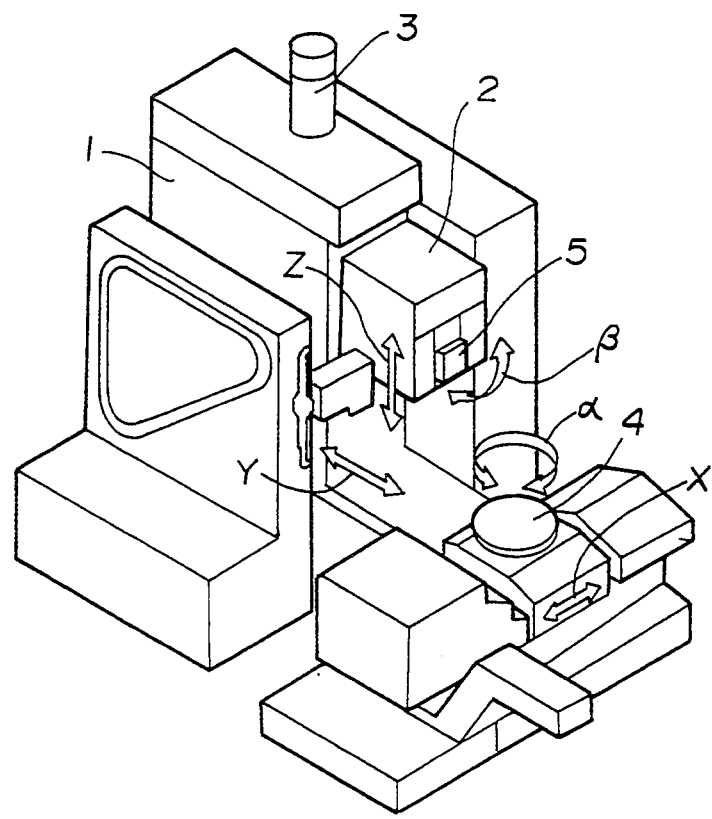
FIG. 5 schematically illustrates a general arrangement of a second embodiment.

FIG. 5 illustrates a general arrangement of a composite machine tool which includes a column 1 movable in a Y-axis direction and a main shaft head 2 provided on the front surface of the column 1. A Z-axis feed motor 3 provided on the column 1 moves the main shaft head 2 in a Z-axis direction (vertically). A turntable 4 provided below the main shaft head 2 is movable in a Y-axis direction and rotatable in a direction shown by an arrow α (horizontally). A workpiece to be machined is fixed on the turntable 4.

Figure 6:
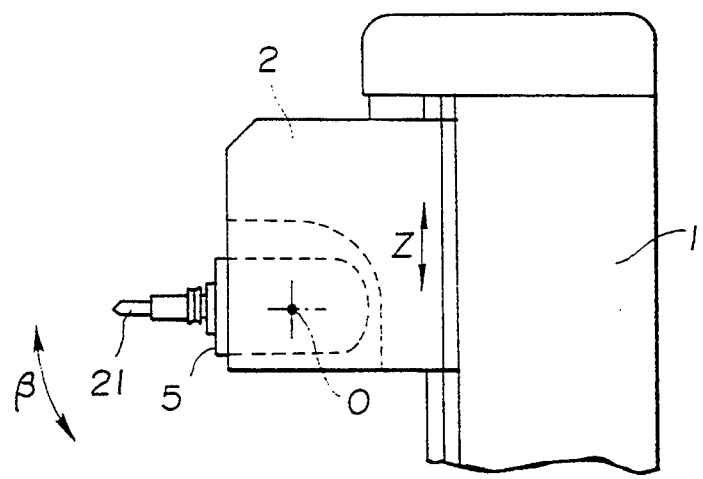
FIG. 6 is an enlarged side view of a main shaft head part.

A swing head 5 provided to the main shaft head 2 is arranged, as shown in FIG. 6, to swing on a pivot center O in a direction shown by an arrow β in a Z-Y plane. A tool 21 is mounted to the swing head 5.

Figure 7:
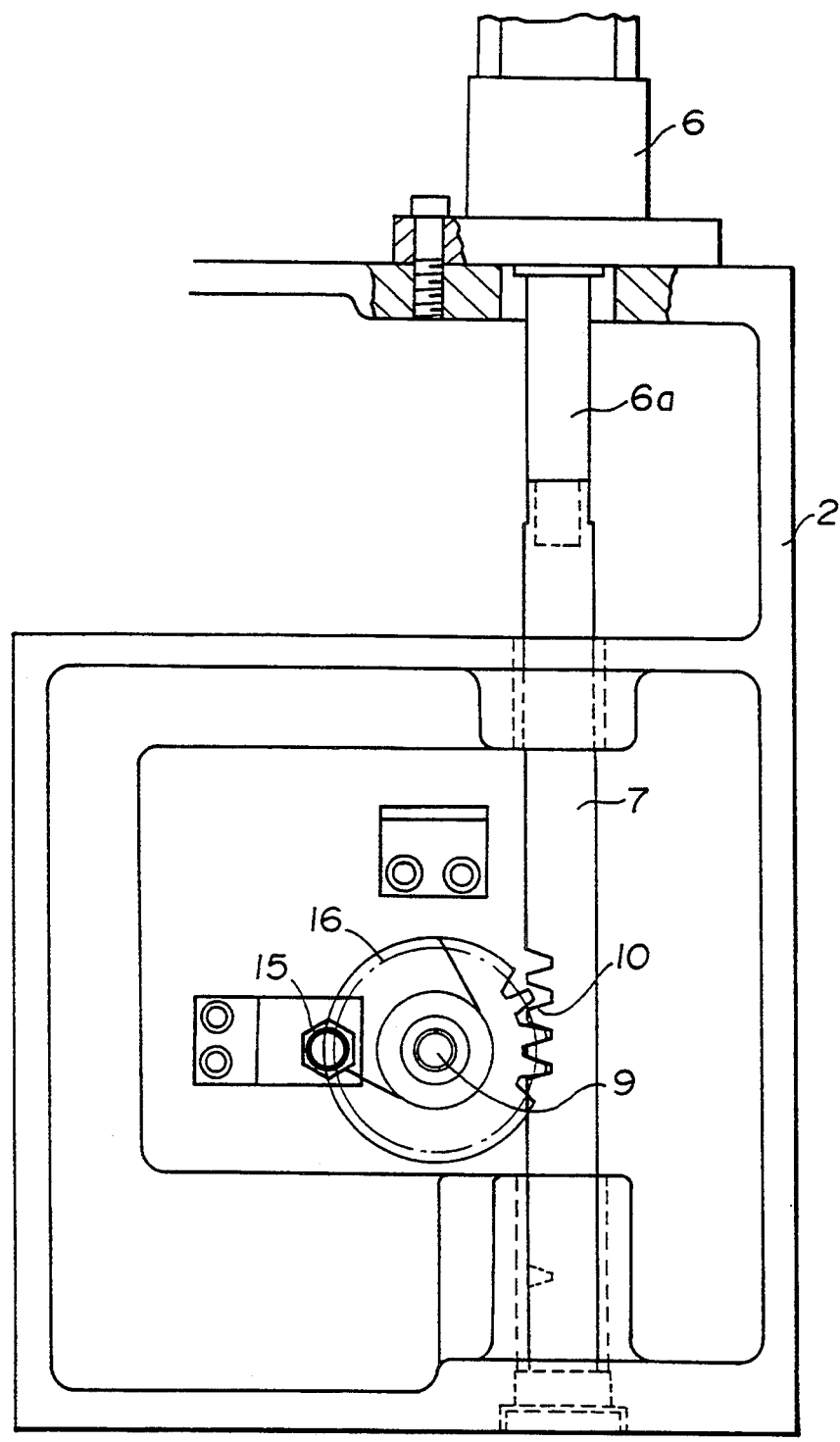
FIG. 7 illustrates details of a swinging mechanism.
Figure 8:
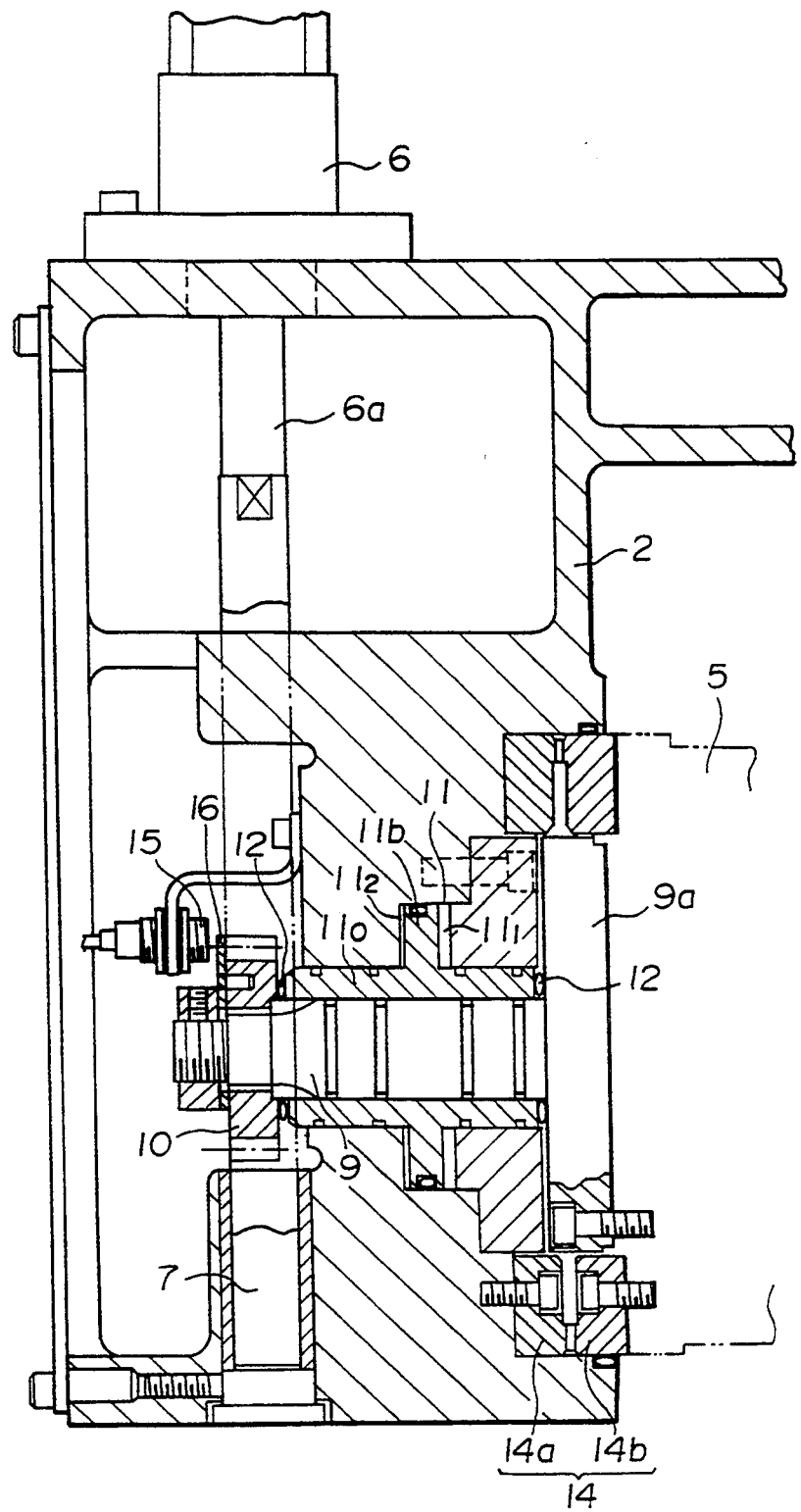
FIG. 8 is a cross-sectional view of the swinging mechanism.
Figure 9:
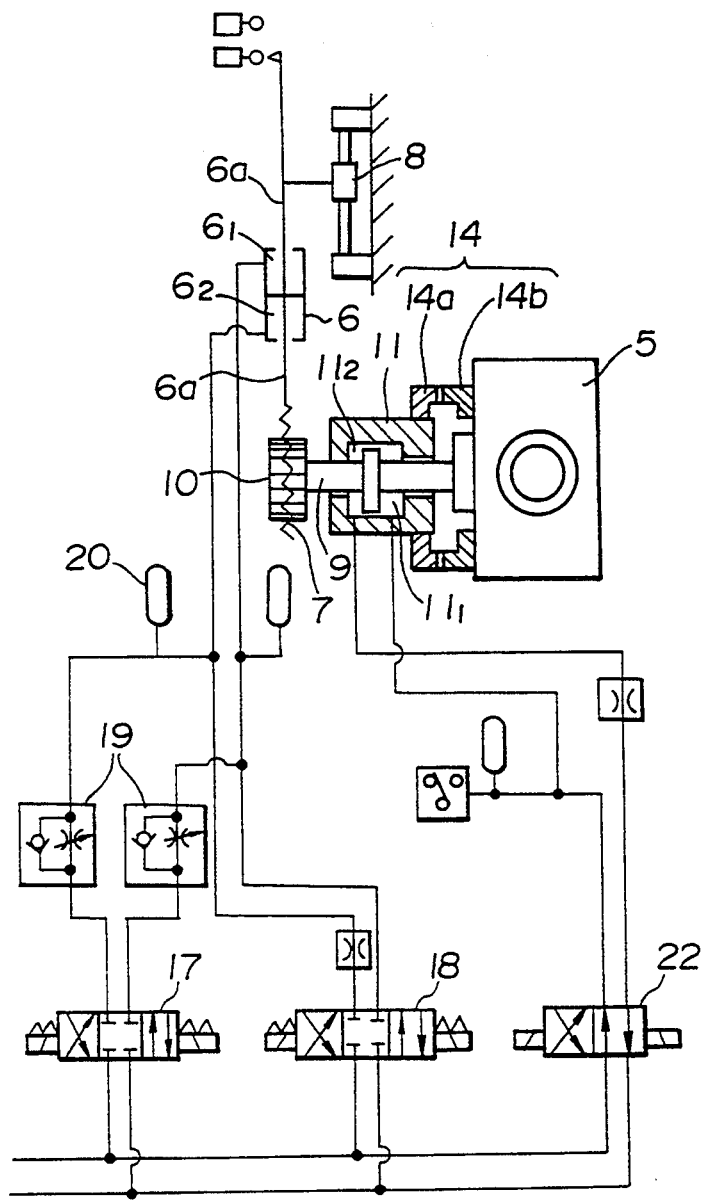
FIG. 9 is a hydraulic circuit of the second embodiment.

The swing head 5 swings by means of a mechanism including a swing cylinder 6, a rack 7 and a pinion 10 as shown in FIGS. 7 to 9. The swing cylinder 6 comprises a hydraulic cylinder having both piston rods one 6a of which is downwardly projected. The piston rod 6a is connected at its tip end with the rack 7. The rack 7 is fixedly mounted at its one end to the swing head 5 and is meshed with the pinion 10 which is fixedly mounted to one end of a driving shaft 9. The driving shaft 9 is fittingly inserted into a hollow piston rod 11a of a clamp cylinder 11. The clamp cylinder 11 is provided within the main shaft head 2. Accommodated within the clamp cylinder 11 is a piston 11b projected from the intermediate part of the piston rod 11a. Both ends of the piston rod 11a abut against the pinion 10 and a flange part 9a of the driving shaft 9 through respective thrust bearings 12.

A curving coupling 14 comprises members 14a and 14b one of which is fixed to the main shaft head 2 and the other is fixed to the swing head 5.

The swing head 5 is clamped to the curving coupling 14 under the influence of hydraulic pressure of oil supplied to an oil chamber 111 of the clamp cylinder 11; while the swing head 5 is unclamped therefrom under the influence of hydraulic pressure of oil supplied to an oil chamber 112.

In the drawings, the reference numeral 15 is a proximity switch for confirming the clamped state of the curving coupling 14 which detects the clamped and unclamped states of the curving coupling 14 by detecting a dog 16 provided on a side surface of the pinion 10.

FIG. 9 shows a hydraulic circuit for controlling the swinging operation of the swing head 5. The hydraulic circuit has indexing solenoid valves 17 and 18 and flow rate control valves 19 for adjusting a swinging speed of the swing head 5 at the time of indexing. The hydraulic circuit is operated to control the swinging operation by supplying compressed oil from the flow rate control valves 19 to the swing cylinder 6.

The solenoid valve 22 is also used to control the clamping and unclamping operation of the curving coupling 14. An accumulator 20 absorbs an oil volume generated by a positional shift of the rack 7 at the clamping time of the curving coupling 14.

In the present embodiment system, for the purpose of detecting an indexed position of the swing head 5, as shown in FIG. 9, the piston rod 6a is projected upwardly of the swing cylinder 6 and a linear encoder 8 is provided for detecting the position of the piston rod 6a. That is, this single linear encoder 8 can detect all indexed positions even when the piston rod 6a is at any position.

Explanation will next be made as to the operation of the composite machine tool. A workpiece to be machined by the composite machine tool is fixedly mounted on the turntable and the tool 21 for machining the workpiece is mounted to the swing head 5. Under such a condition, the indexing operation of the swing head 5 according to the machining position of the workpiece is carried out. However, the following control is fully automatically carried out under control of an NC machine tool (not shown) connected to the composite machine tool.

First, in the indexing operation, compressed oil is supplied from the clamping/unclamping solenoid valve 22 to the oil chamber 112 of the clamp cylinder 11 so that the swing head 5 is pushed to the right by the piston 11b and piston rod 11a, whereby the engagement of the curving coupling 14 is released.

Under this condition, the solenoid valve 18 is turned ON to supply compressed oil to an upper oil chamber 61 of the swing cylinder 6, which results in that the driving shaft 9 is rotated through the cooperation of the rack 7 and pinion 10 and the swing head 5 is quickly swung toward the index position of the swing head 5.

During the quick swinging operation, an index position angle θ set by the operator is always detected by the linear encoder 8 and a detection output of the encoder is input to the NC machine tool.

Figure 10:
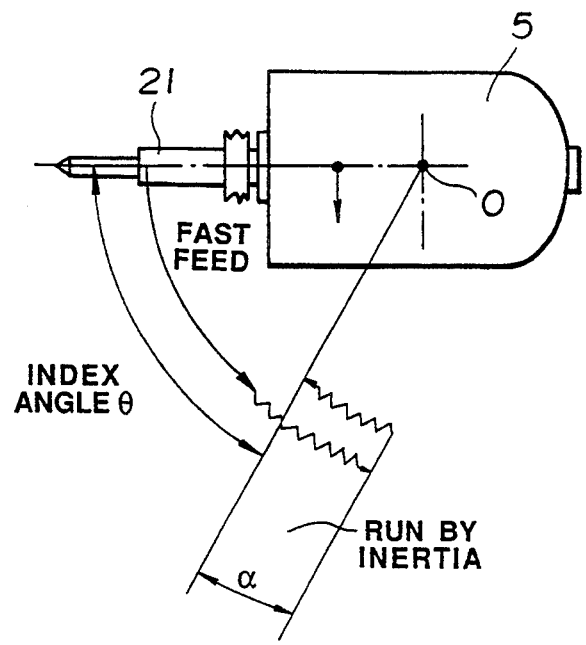
FIG. 10 is a diagram for explaining the operation of the swinging mechanism.
Figure 11:
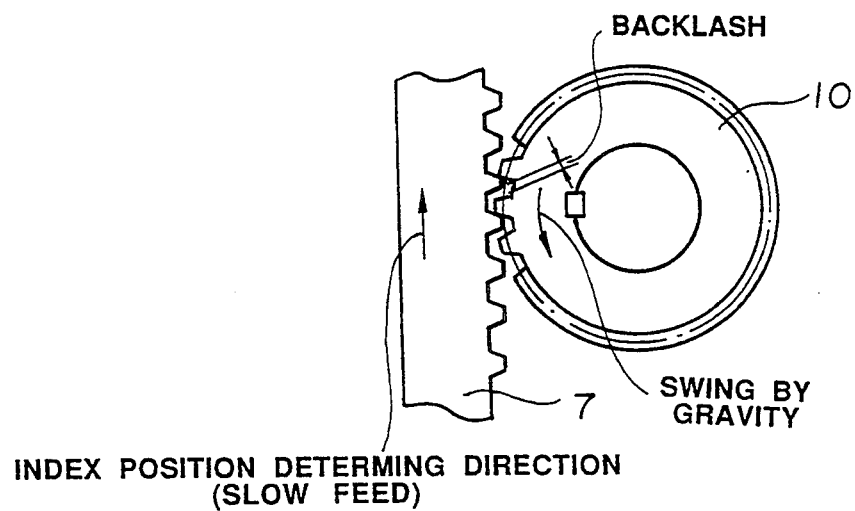
FIG. 11 is a diagram for explaining the operation of the swinging mechanism.

When the NC machine tool detects on the basis of the detection output of the linear encoder 8 that the swing head 5 has arrived at a predetermined position before the index position, the solenoid valve 18 is turned OFF. At this time, however, since the swing head 6 is quickly swung, its inertia force causes the swing head to be overshot by an additional angle α from the index angle θ as shown in FIG. 10.

As the solenoid valve 18 is turned OFF, the NC machine tool turns ON the solenoid valve 17. This causes the compressed oil adjusted with respect to flow rate by a throttle value 19 to be supplied from the throttle value to the lower oil chamber 62 of the swing cylinder 6, so that the swing head 5 is swung in the opposite direction to the above at a very low speed. When the detection output of the linear encoder 8 again coincides with the index angle θ, the NC machine tool causes the solenoid valve 17 to be turned OFF.

In the manner described above, the swing head 5 is accurately positioned at the predetermined index angle θ. According to this indexing system, since the positioning of the swing head 5 is realized after the swing head is swung in the opposite direction to the gravity direction, the final positioning can be attached with the backlash removed.

Figure 12:
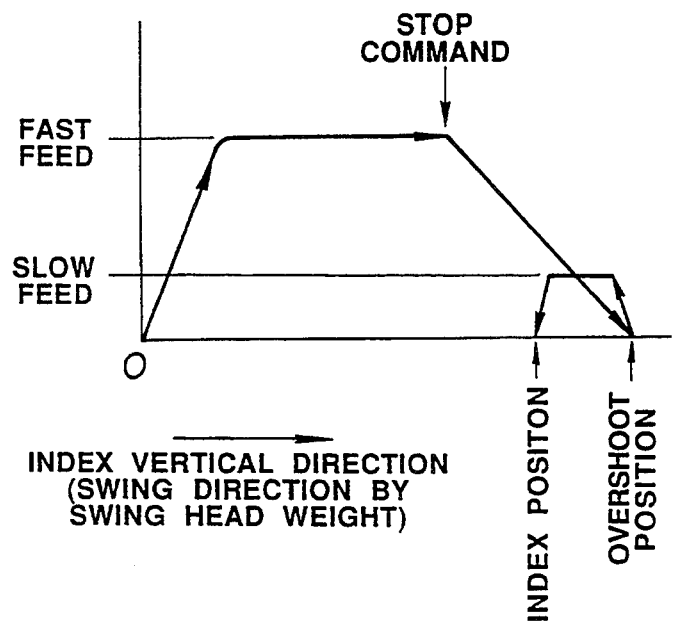
FIG. 12 is a timing chart for explaining the operation of the swinging mechanism.
Figure 13:
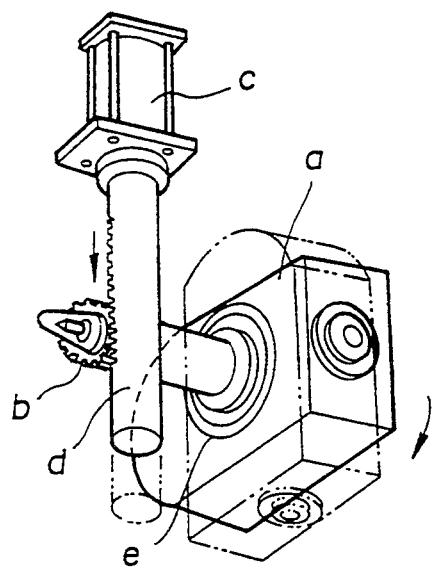
FIG. 13 is a diagram for explaining a prior art.

FIG. 12 shows a timing chart of the positioning operation of such a swing head.

When the positioning operation of the swing head 5 is completed in this way, the clamping/unclamping solenoid value 22 is switched to its clamp mode. As a result, the compressed oil is again supplied from the value 22 to the oil chamber 111 of the clamping cylinder 11 so that the piston 11b and piston rod 11a cause the driving shaft 9 to be pushed to the left, whereby the curving coupling 14 is engaged and the swing head 5 is clamped to the main shaft head 2.

Under such a condition, the workpiece can be machined by the tool 21 mounted to the swing head 5.

When the machining the workpiece is completed, the swing head 5 is returned to its initial position to get ready for the next indexing operation.

INDUSTRIAL APPLICABILITY

The present invention is usefully applicable to an NC machining system comprising a plurality of NC machine tools each having a tool changer.

We claim:

1. An NC machining controller for an NC machining system including a plurality of NC machining apparatuses each having a tool changer for allowing automatic selection of a desired tool from a plurality of magazine pots, the NC machining controller comprising:

a first computer for performing general control over the plurality of NC machining apparatuses, the first computer having:
- a tool code memory for storing data on correspondence between tools and tool codes;
- a tool information memory for storing tool shape information and machining ability information for each of the tool codes; and
- automatic programming means for generating an NC machining program including a T code command to which a specified tool code is added and for outputting the NC machining program to the NC machining apparatuses together with the tool shape information and machining ability information corresponding to the specified tool, and a second computer connected to the first computer and provided in each of the NC machining apparatuses, the second computer having:
- a magazine address memory for storing data on correspondence between the tool code and a magazine address of the associated tool changer;
- T code command generation means for converting the tool code added to the T code command in the NC machining program into a magazine address of the tool changer corresponding to the tool code on the basis of contents stored in the magazine address memory and for generating a T code command for specifying the converted magazine address;
- tool correction command generation means for generating a tool correction command on the basis of the tool shape information received from the computer; and
- machining condition command generation means for generating a machining condition command on the basis of the machining ability information received from the computer, wherein each of the NC machining apparatuses and associated one of the tool changers are driven according to the NC machining program including the generated T code command, tool correction command and machining condition command.

2. An NC machining controller as set forth in claim 1, wherein the machining ability information includes parameters such as main shaft rotational speed and feed speed.

3. An NC machining controller as set forth in claim 1, wherein the tool shape information includes parameters such as tool shape and tool dimensions.

4. An NC machining controller as set forth in claim 1, wherein the automatic programming means receives the tool code corresponding to the specified tool from the tool code memory, generates the NC machining program including the T code command to which the received tool code is added with use of part number information, quality information, machining information and accuracy information necessary for machining a work, and outputs the generated NC machining program to the NC machining apparatuses together with the tool shape information and machining ability information corresponding to the specified tool.

5. An NC machining controller as set forth in claim 1, wherein the tool correction command generation means has a table in which correspondence between tool shape information and correction numbers and correction data is set, and generates the tool correction command corresponding to the tool shape information received from the computer with use of the table.

6. An NC machining controller as set forth in claim 1, wherein the machining condition command generation means has a table in which correspondence between machining ability information and machining condition commands is set, and generates the machining condition command corresponding to the machining ability information received from the computer with use of the table.

7. An NC machining controller as set forth in claim 1, wherein arrangement information, usage situation information and quality information for tool management are set for each tool code and stored in the tool information memory.

* * * * *